(12) United States Patent
Karppanen (10) Patent No.: US 10,574,653 B1
(45) Date of Patent: Feb. 25, 2020

(54) SECURE POSTURE ASSESSMENT (71) Applicant: Amazon Technologies, Inc., Seattle, WA (US)

(72) Inventor: Jari Juhani Karppanen, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 15/718,660

(22) Filed: Sep. 28, 2017

(51) Int. Cl.
H04L 29/06 (2006.01)
H04L 9/32 (2006.01)
G06F 21/50 (2013.01)

(52) U.S. Cl.
CPC .............. *H04L 63/10* (2013.01); *G06F 21/50* (2013.01); *H04L 9/3247* (2013.01); *H04L 63/101* (2013.01)

(58) Field of Classification Search
CPC ..... H04L 63/10; H04L 9/3247; H04L 63/101; G06F 21/50
See application file for complete search history.

(56) References Cited

U.S. PATENT DOCUMENTS

| 6,055,637 | A  | * | 4/2000  | Hudson  ............... | G06F 21/6218 709/225 |
| 8,997,201 | B2 | * | 3/2015  | Wotring ............... | H04L 63/1416 713/153 |
| 9,756,047 | B1 | * | 9/2017  | Batchu  ................. | H04W 12/10 |
| 10,061,915 | B1 | * | 8/2018 | Roth  ...................... | H04L 67/10 |
| 2006/0200450 | A1 | * | 9/2006 | Keane  ................... | G06F 16/284 |
| 2007/0277240 | A1 | * | 11/2007 | Durfee  ................. | G06F 21/577 726/24 |
| 2008/0005359 | A1 | * | 1/2008 | Khosravi  ............... | H04L 63/06 709/250 |
| 2010/0175134 | A1 | * | 7/2010 | Ali-Ahmad  ......... | H04L 63/1408 726/24 |
| 2010/0175135 | A1 | * | 7/2010 | Kandek  ............... | H04L 63/1433 726/25 |
| 2010/0333168 | A1 | * | 12/2010 | Herrod  ................ | H04L 41/0813 726/1 |
| 2011/0055381 | A1 | * | 3/2011 | Narasimhan  .......... | H04L 41/046 709/224 |
| 2012/0131685 | A1 | * | 5/2012 | Broch  .................... | G06F 21/554 726/30 |
| 2013/0305340 | A1 | * | 11/2013 | Wotring  .............. | H04L 63/1416 726/11 |
| 2016/0191567 | A1 | * | 6/2016 | Chahal  .................. | H04W 12/00 726/1 |

(Continued)

Primary Examiner — Michael Pyzocha
(74) Attorney, Agent, or Firm — Knobbe, Martens, Olson & Bear, LLP (57) ABSTRACT A posture assessment system is provided that uses an application programming interface ("API"), integrated into a computing device operating system, to assess the posture of the computing device. The API provides temporarily heightened access to the operating system, and executes code provided by the posture assessment system. The code may cause performance of various operations on the computing device, such as generating encoded representations of operating system components, performing computationally-expensive functions to verify execution of the code, and the like. The output of these operations can be sent to the posture assessment system for verification.

20 Claims, 6 Drawing Sheets (56) References Cited

U.S. PATENT DOCUMENTS

| | | | | |
|---|---|---|---|---|
| 2016/0308912 A1* | 10/2016 | Mulgaonkar | ......... | G06F 21/577 |
| 2017/0041343 A1* | 2/2017 | Wong | ...................... | H04L 63/20 |
| 2017/0264619 A1* | 9/2017 | Narayanaswamy | .. | H04L 63/104 |
| 2017/0286694 A1* | 10/2017 | Swidowski | ......... | G06F 9/45558 |
| 2017/0339018 A1* | 11/2017 | Prabhu | ................ | H04L 41/0893 |
| 2017/0339190 A1* | 11/2017 | Epstein | ................... | H04L 63/20 |
| 2017/0374067 A1* | 12/2017 | Quintas | ................... | G06F 21/44 |
| 2018/0039771 A1* | 2/2018 | Konstantinov | ....... | G06F 21/121 |
| 2018/0091540 A1* | 3/2018 | Solow | ................ | H04L 63/1433 |
| 2018/0091553 A1* | 3/2018 | Mandyam | ........... | H04L 63/1408 |
| 2018/0232517 A1* | 8/2018 | Roth | ....................... | G06F 21/50 |

* cited by examiner

SECURE POSTURE ASSESSMENT

BACKGROUND

Computing systems often exchange information via communication networks. Some networks may grant, restrict, or refuse network access to a computing system depending upon the posture of the particular computing system. The posture of a computing system may include the operating system, drivers, applications, and various software or hardware components on the computing system, the security configuration and settings of the computing system, and other information regarding the state of the computing system. In some implementations, the posture may be assessed prior to granting access to a network. The posture assessment may be performed remotely based on information provided by the computing system, or locally by a component on the computing system.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to a posture assessment system that uses an application programming interface ("API"), integrated into computing device operating systems, to assess the posture of the computing devices. In some embodiments, the API can provide temporarily heightened privileges to access the operating system and execute code provided by the posture assessment system. The code may cause performance of various operations on a computing device, such as generating encoded representations of operating system components, performing computationally-expensive functions to verify execution of the code, and the like. The output of these operations can be sent to the posture assessment system for verification. If the output is verified by the posture assessment system (e.g., it matches the expected output, and therefore provides confirmation that the operating system components expected to be present on the computing device are indeed present), the posture assessment system can authorize network access to the computing device or otherwise indicate that the current configuration of the computing device is as expected.

Generally described, the posture of a computing device may include the operating system, drivers, applications, and various software or hardware components of the computing device, the security configuration and settings of the computing device, other information regarding the state of the computing device, some combination thereof, etc. Using conventional posture assessment techniques, it can be difficult to determine whether a computing device has not been compromised or otherwise may be trusted. For example, custom-built or modified operating systems can simulate or "spoof" authentic, un-compromised operating systems and provide misleading information to posture assessment applications and systems. Without root or administrator-level privileges, a posture assessment system may not be able to verify whether an operating system is authentic or compromised. In addition, it may not be feasible to ask for root-level access on a computing device. Moreover, having a "rooted" device may be cause for failing a posture assessment.

Aspects of the present disclosure relate to an operating system API that provides a temporarily-heightened level of privileges (root-level or administrator-level) to access the operating system and other components of the computing device. The API executes code, received from a remote posture assessment system, using the temporarily-heightened level of access privileges. In this way, the posture assessment system can effectively execute posture assessment code on a computing device using root-level privileges, thereby providing a higher degree of confidence in the posture assessment than is possible using conventional posture assessment techniques.

Although aspects of some embodiments described in the disclosure will focus, for the purpose of illustration, on particular examples of computing devices, operating system component verification methods, execution confirmation functions, and the like, the examples are illustrative only and are not intended to be limiting. In some embodiments, the techniques described herein may be applied to additional or alternative computing devices, operating system component verification methods, execution confirmation functions, and the like. For example, although the target of the posture assessment will be referred to as a "computing device," in some embodiments the posture of a multi-device computing system may be assessed. Various aspects of the disclosure will now be described with regard to certain examples and embodiments, which are intended to illustrate but not limit the disclosure.

Example Data Flows and Interactions

Figure 1:
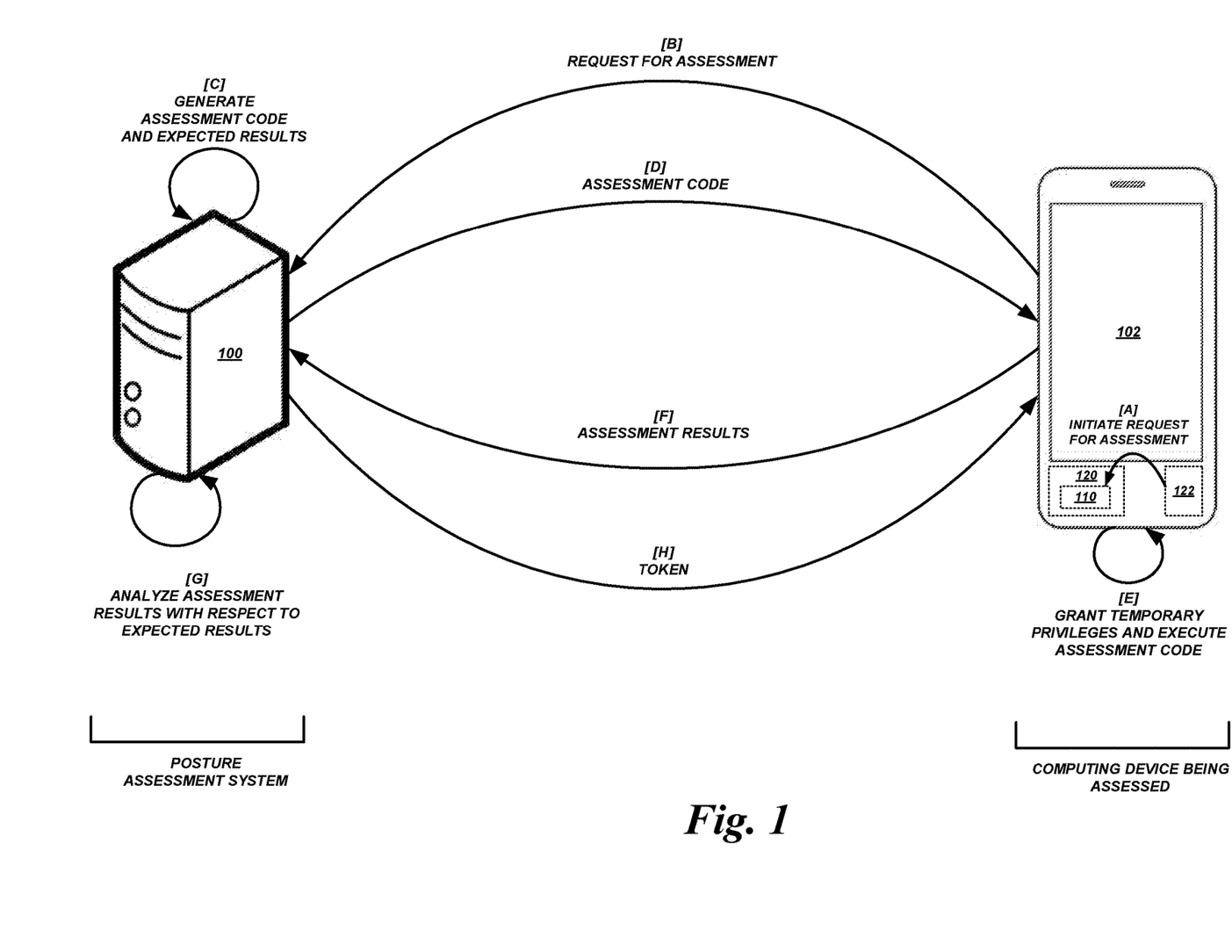
FIG. 1 is a block diagram of illustrative data flows and interactions between a posture assessment system and a computing device according to some embodiments.

With reference to an illustrative embodiment, FIG. 1 shows example data flows and interactions between a posture assessment system 100 and a computing device 102. As shown, the computing device 102 may have an operating system 120 and an application 122. The operating system 120 can include an API 110 that provides posture assessment functionality to applications and remote systems, such as the application 122 and the posture assessment system 100.

In one non-limiting example, the application 122 may be configured to access a secure system remote from the computing device 102. Prior to accessing the secure system, the computing device 102 may be required to be assessed (e.g., for security vulnerabilities, required configuration, etc.). The application 122 may request such an assessment via the API 110 at [A]. In some embodiments, the request, which may be in the form of a programmatic call to a function exposed by the API, may include or otherwise be associated with various parameters. For example, the application 122 may request the assessment to be performed by a particular remote posture assessment system.

Figure 4:
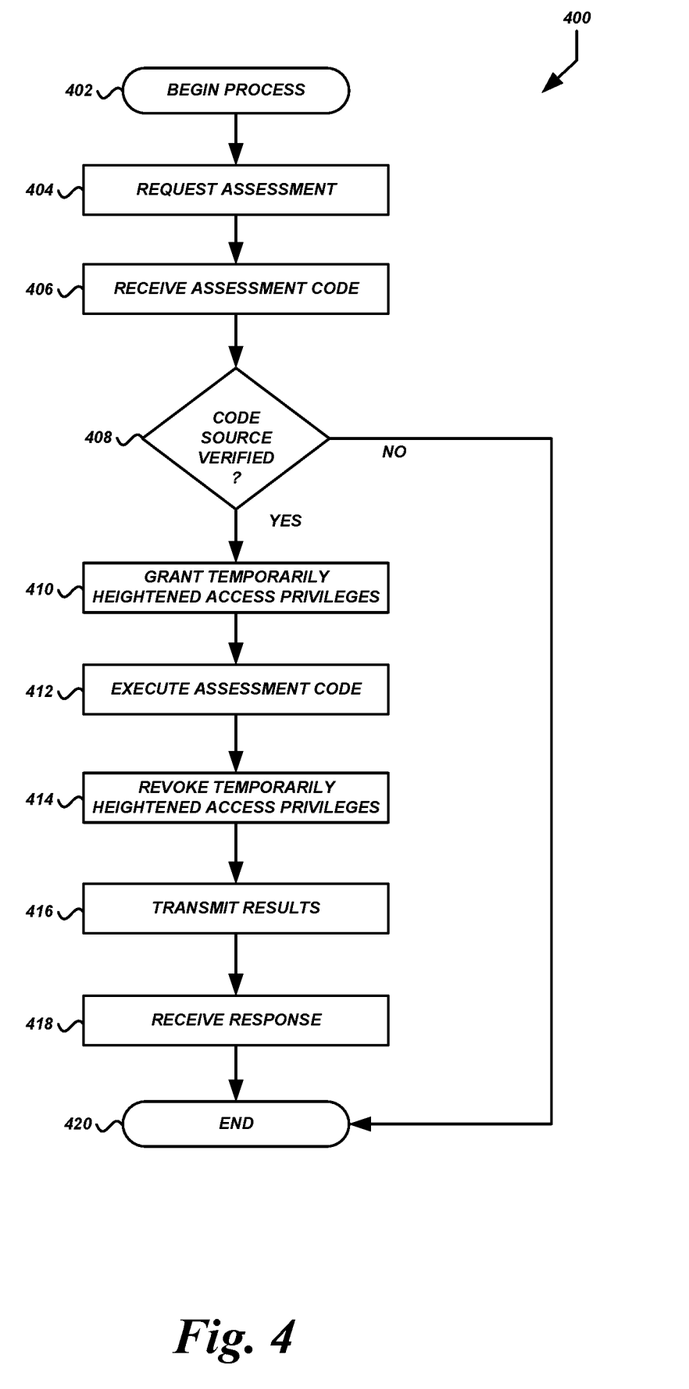
FIG. 4 is a flow diagram of an illustrative process for requesting and performing a posture assessment according to some embodiments.

The API 110 may initiate a request at [B] for assessment by the posture assessment system 100. The request, which may be in the form of a network transmission to the posture assessment system 100, may include or otherwise be associated with information regarding the computing device 102. For example, the API 110 may include version information indicating a version of an operating system 120, API 110, application 122, or other module or component of the computing device 102. An example process for requesting posture assessment and performing related operations is shown in FIG. 4 and described in greater detail below.

The posture assessment system 100 may generate client-side executable code at [C] to be executed by the computing device 102 as part of the posture assessment. Such client-side executable code may be referred to as assessment code. The assessment code may be generated such that, when executed by the computing device 102, it performs operations and generates output that the posture assessment system 100 can use to determine whether the computing device 102 has a valid configuration. For example, the posture assessment system 100 can determine, based on version information received from the computing device 102 with the request for posture assessment, that certain versions of operating system components will be present on the computing device 102 if the computing device 102 has not been compromised. The posture assessment system 100 can generate assessment code that checks for the identified operating system components on the computing device 102, and then generates information regarding the components (e.g., a hash or other encoded representation).

In some embodiments, the posture assessment system 100 may also generate assessment code that performs operations on the computing device 102 and generates output that the posture assessment system 100 can use to verify that the assessment code was actually received and executed without modification by the computing device 102. Such assessment code may generate output that can be used as a fingerprint of execution: correct output provides verification, to a reasonable degree of certainty, that the assessment code was executed by the computing device 102 and the output was not simulated or spoofed. For example, such assessment code may cause the computing device 102 to perform one or more computationally-expensive functions within a period of time. Without prior knowledge of which computationally-expensive functions are to be executed, correct output of the functions may not be able to be simulated or spoofed within the period of time.

Figure 3:
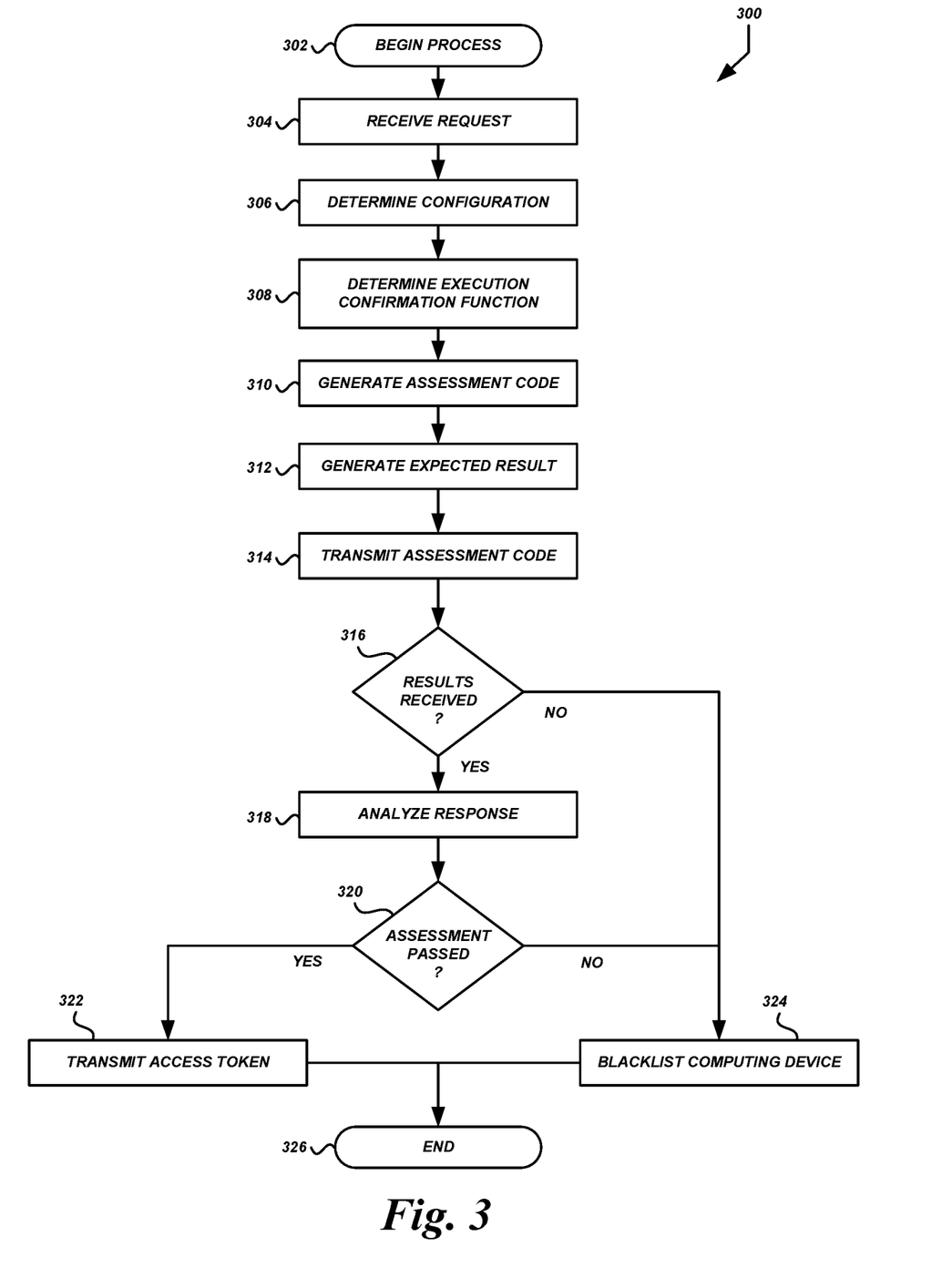
FIG. 3 is a flow diagram of an illustrative process for performing a posture assessment according to some embodiments.

The posture assessment system 100 can transmit the assessment code to the computing device 102 at [D]. In some embodiments, the assessment code may be cryptographically signed so that the computing device 102 can verify that the assessment code came from the posture assessment system 100 rather than some other potentially malicious source. An example process for generating executable posture assessment code and verifying output of the code is shown in FIG. 3 and described in greater detail below.

Figure 5:
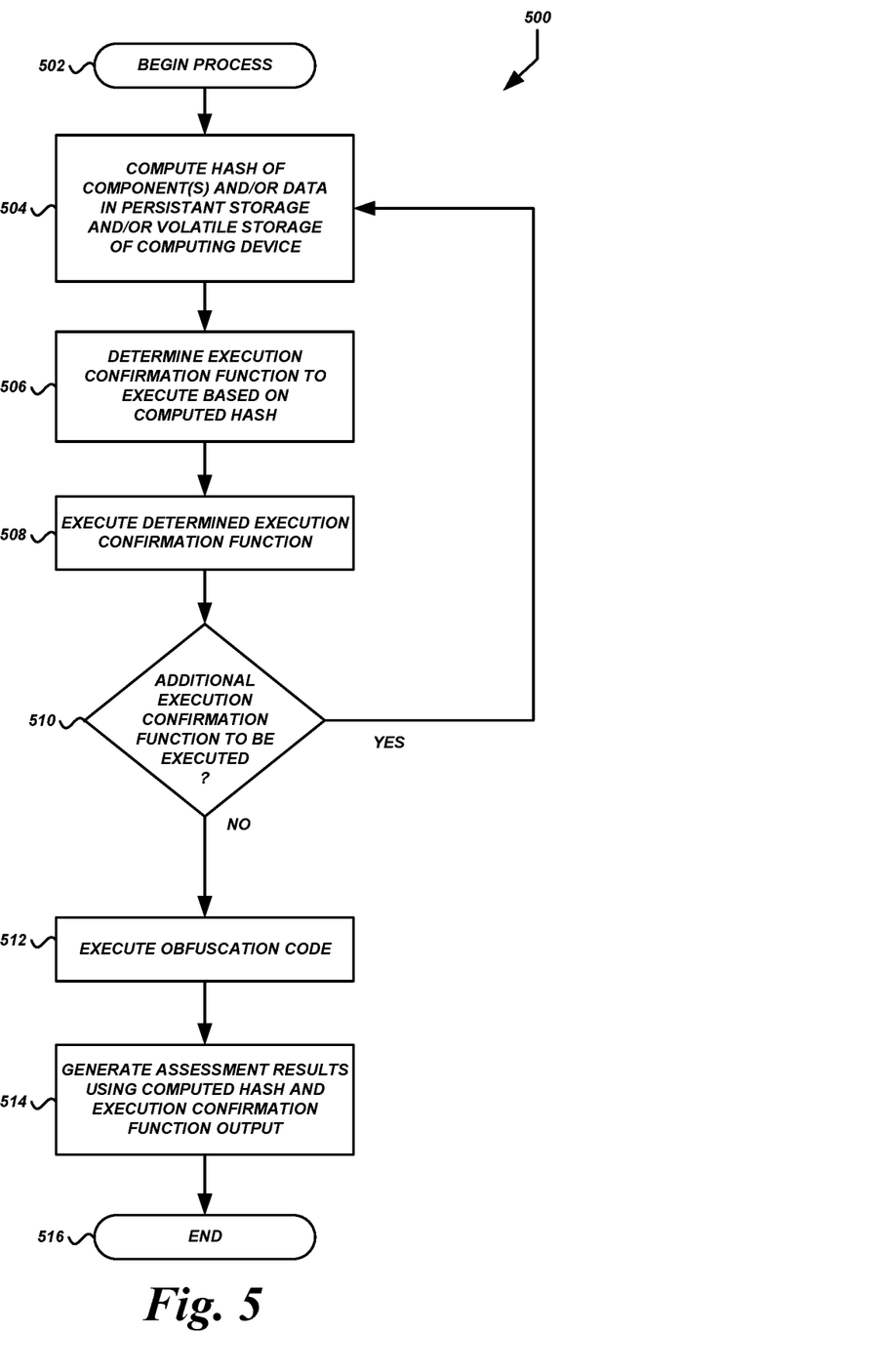
FIG. 5 is a flow diagram of an illustrative process for executing remotely-generated posture assessment instructions according to some embodiments.

The API 110 of the computing device 102 can grant temporarily heightened privileges and execute the assessment code, generated by the posture assessment system 100, at [E]. For example, the assessment code can access operating system files in non-volatile storage and/or operating system data in volatile storage that would not otherwise be accessible without the heightened privileges. The assessment code can generate an encoded representation of the operating system 120 components, such as by generating a hash of the components. In addition, the assessment code can perform an execution confirmation function, such as a computationally expensive function, to generate a fingerprint of execution. Output of the function can be included in a message to be sent back to the posture assessment system 100, or combined with the encoded representation of the operating system 120 components (e.g., used as input to a hash function to generate another hash). An example process for executing posture assessment code generated by the posture assessment system 100 is shown in FIG. 5 and described in greater detail below.

The computing device 102 can transmit output of the assessment code operations to the posture assessment system 100 at [F]. Once the assessment code generated by the posture assessment system 100 has finished executing, the period of temporarily-heightened privileges granted by the API 110 can be terminated, thus reducing the likelihood that a security flaw will be exposed.

The posture assessment system 100 can analyze the output of the assessment code operations at [G]. The output may be analyzed against expected output that was generated by the posture assessment system 100 when originally generating the assessment code. For example, the posture assessment system 100 may have generated an expected output at [C] when generating the assessment code. Now that the posture assessment system 100 has received the actual output of the code as executed by the computing device 102, the posture assessment system 100 can verify whether the actual output matches the expected output. If so, the posture assessment system 100 can determine that the computing device 102 has passed the assessment. In such cases, the computing device 102 may be added to a whitelist, a message may be transmitted to the computing device 102, etc. Otherwise, if the actual output does not match the expected output, the posture assessment system 100 can determine that the computing device 102 has failed the assessment. In this case, the computing device 102 may be added to a blacklist, a message may be transmitted to the computing device 102, etc.

The posture assessment system 100 may transmit a token or other message to the computing device 102 at [H]. For example, if the posture assessment system 100 determines that the computing device 102 has passed the posture assessment, the posture assessment system 100 can transmit a network access token to the computing device 102. The computing device 102 may use the token to establish a future connection with a remote computing system, whether the posture assessment system 100, a system associated with the posture assessment system 100, or some other system altogether.

Network-Based Computing Environment

Figure 2:
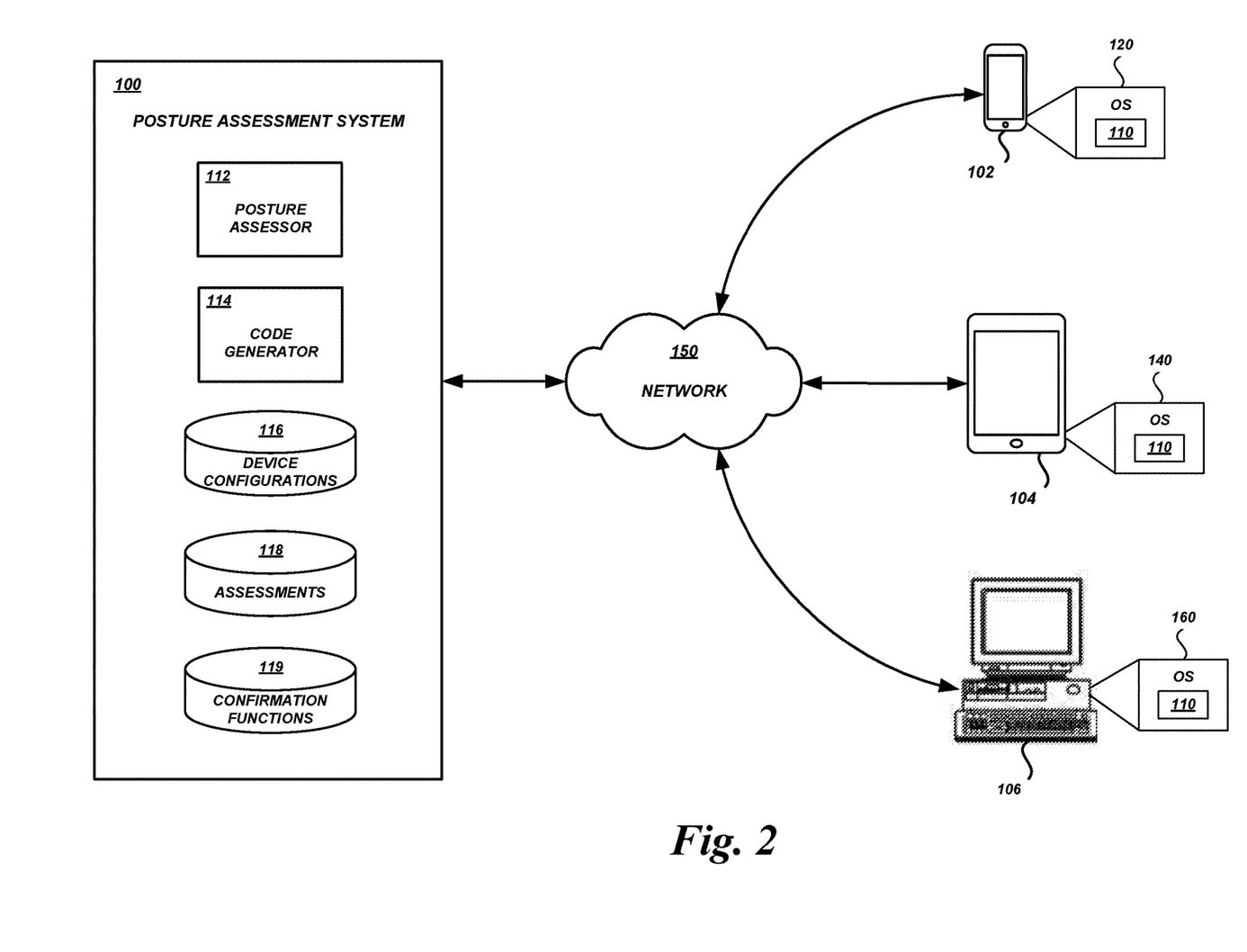
FIG. 2 is a block diagram of an illustrative computing environment including a posture assessment system and various computing devices according to some embodiments.

FIG. 2 shows a network environment in which aspects of the present disclosure may be implemented. As shown, the network environment may include a posture assessment system 100 and various computing devices 102, 104, and 106 (collectively "computing devices 102-106"). The computing devices 102-106 and posture assessment system 100 may communicate with each other via one or more communication networks, such as communication network 150. The communication network 150, also referred to herein as a "network" for convenience, may be or include a private network, personal area network, local area network, wide area network, cable network, satellite network, cellular data network, etc., or a combination thereof, some or all of which may or may not have access to and/or from the Internet.

The posture assessment system 100 may include various components for providing the features described herein. Illustratively, the posture assessment system 100 may include a posture assessor 112 for managing the process of assessing the posture of computing devices 102-106. The posture assessment may also include a code generator 114 for generating assessment code to be executed by particular computing device 102, 104, or 106 to produce output that can be used assess the posture of the particular computing device. The posture assessment system 100 may also include various data stores, such as a device configurations data store 116 for storing information about the various device configurations that the posture assessment system 100 can assess and verify. The posture assessment system 100 may also include an assessments data store 118 for storing information about the outcome of individual assessments. The posture assessment system 100 may also include a confirmation functions data store 119 for storing information about computationally complex functions, computationally expensive functions, or other functions to be performed by a computing device being assessed. The confirmation functions data store 119 may store executable code and expected output for multiple separate execution confirmation functions 119, and the specific execution confirmation functions to be executed by a computing device may be chosen by the code generator 114 as described in greater detail below.

The example components and data stores of the posture assessment system 100 shown in FIG. 2 are illustrative only, and are not intended to be limiting. In some embodiments, a posture assessment system 100 may have fewer, additional, and/or alternative components and data stores.

The posture assessment system 100 may be implemented on one or more physical server computing devices that provide posture assessment services to computing devices 102-106. In some embodiments, the posture assessment system 100 (or individual components thereof, such as the posture assessor 112, code generator 114, etc.) may be implemented on one or more host devices, such as blade servers, midrange computing devices, mainframe computers, desktop computers, or any other computing device configured to provide computing services and resources. For example, a single host device may execute one or more posture assessors 112, code generators 114, data stores 116, 118, some combination thereof, etc. The posture assessment system 100 may include any number of such hosts.

In some embodiments, the features and services provided by the posture assessment system 100 may be implemented as web services consumable via one or more communication networks. In further embodiments, the posture assessment system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual computing devices 102-106 may be any of a wide variety of electronic communication devices, including personal computing devices, terminal computing devices, laptop computing devices, tablet computing devices, electronic reader devices, wearable computing devices, mobile devices (e.g., cellular and other mobile phones, smart phones, media players, handheld gaming devices, etc.), set-top boxes, streaming media devices, smart home appliances, and various other electronic devices and appliances. The computing devices 102-106 may execute operating systems 120, 140, and 160, respectively. In some embodiments, as shown, the operating systems 120, 140, and 160 may include an integrated API 110 that provides various posture assessment features described herein.

Example Process for Generating Assessment Code and Analyzing Results

FIG. 3 is a flow diagram of an illustrative process 300 that may be executed by a posture assessment system 100 to assess the posture of a computing device, such as one of the computing devices 102-106 shown in FIG. 2 and described above. Advantageously, the posture assessment system 100 can generate assessment code that is executed, by an API of the computing device being assessed, using a heightened level of privileges. In this way, the posture assessment system 100 can use the assessment code to remotely access components of the operating system of the computing device that would otherwise not be accessible. The heightened level of privileges allows the assessment code to perform operations that ensure the computing device has not been compromised and that the assessment code has indeed been received and executed by the computing device without being compromised.

The process 300 shown in FIG. 3 begins at block 302. The process 300 may begin in response to an event, such as when the posture assessment system 100 receives a request from a computing device for assessment. For example, the API 110 of a computing device 102 may initiate a posture assessment request, as described above and in greater detail below. When the process 300 is initiated, a set of executable program instructions stored on one or more non-transitory computer-readable media (e.g., hard drive, flash memory, removable media, etc.) may be loaded into memory (e.g., random access memory or "RAM") of a server computing device or other component of the posture assessment system 100. In some embodiments, the process 300 or portions thereof may be implemented on multiple processors, serially or in parallel.

At block 304, the posture assessor 112 or some other module or component of the posture assessment system 100 can receive a request for posture assessment. In some embodiments, the request may include, reference, or otherwise be associated with information regarding the computing device to be assessed (computing device 102 in this example), the operating system 120 of the computing device 102, the user of the computing device 102, and/or various other information that may be used to determine which components or data are expected to be on the computing device 102. For example, the request may include information regarding an identity and/or version of the operating system 120 or certain components thereof, an identity and/or version of an application 122 that initiated the posture assessment request, etc. In some embodiments, the posture assessment system 100 may not receive a request to assess the computing device 102. Instead, the posture assessment system 100 may determine to initiate assessment of the posture of the computing device 102 based on one or more criteria, such as expiration of a period of time since the last posture assessment of the computing device 102, detection that the computing device 102 is connected to a network, etc. In some embodiments, the posture assessment system 100 may initiate assessment of the posture of the computing device 102 in response to a request from another device or system. For example, a separate system that is a third party to the posture assessment system 100 and computing device 102 may request the posture assessment system 100 to assess the posture of the computing device 102. This request may be made, e.g., before a third-party system allows the computing device 102 to connect to the third-party system or perform some other operation.

At block 306, the posture assessor 112 or some other module or component of the posture assessment system 100 can determine the expected current configuration of the computing device 102. For example, the posture assessor 112 can use information included in, referenced by, or otherwise associated with the posture assessment request to access data in the device configurations data store 116 regarding the expected current configuration of the computing device 102. In some embodiments, the expected current configuration may be based on which components or data are expected to be present on the computing device 102 if the computing device 102 has not been compromised. In some embodiments, the expected current configuration may be based on which components or data are required for the computing device 102 to pass the assessment and be permitted to access a network or system.

At block 308, the posture assessor 112, code generator 114, or some other module or component of the posture assessment system 100 can determine one or more execution confirmation functions to be executed by the computing device 102. An execution confirmation function may be a function that, if executed according to certain requirements, can generate output that is difficult to simulate while still satisfying the requirements. Therefore, a successful execution that both produces expected output and satisfies the execution requirements can provide evidence that the execution confirmation function was actually executed by the computing device, and that its output was not tampered with or simulated. The output and requirement satisfaction of such an execution confirmation function may be referred to as a "fingerprint" of execution. Although the correct output of the execution confirmation function and satisfaction of its execution requirements may be required to pass the posture assessment, in some instances the execution confirmation function may not necessarily provide information about which operating system components or other data of interest is on the computing device 102.

In some embodiments, the execution confirmation function may be a computationally complex or otherwise computationally expensive function that takes at least a threshold or minimum period of time to execute. The execution confirmation function may perform various time-consuming mathematical operations and may have an output range that is large enough that it is difficult or statistically unlikely that correct output for a given input may be determined by chance. For example, the execution confirmation function may include determining the proper key to decrypt an encrypted message and recover the plain text. The message may be relatively weakly encrypted such that the proper key may be determined within a reasonable period of time (e.g., by brute force within a period of less than a minute, or less than 5 minutes). As another example, the execution confirmation function may include the repeated execution of certain operations to obtain results, such as repeated recursive executions of functions, counting, or the like.

In some embodiments, the execution requirements for the execution confirmation function may include a requirement that the execution confirmation function complete execution and provide output within a maximum period of time. The maximum period of time may be set large enough that the computing device 102 is guaranteed (or highly likely) to be able to complete execution of the execution confirmation function and provide results back to the posture assessment system 100 within the maximum period of time, but not so large that code for executing the execution confirmation function can be reverse engineered or otherwise analyzed and its output can be simulated. Successful performance of an execution confirmation function (e.g., generation of accurate output within the time limit) is indicative of execution, by the computing device, of the assessment code provided by the posture assessment system 100 without being tampered with or reverse-engineered.

The code generator 114 may select an execution confirmation function from a set of possible execution confirmation functions. For example, the code generator 114 may include or have access to a library of several (e.g., 5, 10, 20, 100, or more) execution confirmation functions from which to select. Each execution confirmation function may have an associated index or some other identifier. The code generator 114 may select an execution confirmation function that has an index that equals some value to be computed by the computing device 102 while the computing device 102 executes the assessment code generated by the code generator 114. For example, the code generator 114 may include assessment code for generating a hash of an operating system component on the computing device 102. This hash can then be used to determine an index for the execution confirmation function to be generated. Illustratively, a particular number of the hash, or computed from the hash, may be used as the index to a table of possible execution confirmation functions to execute. By requiring the index to be calculated at run time based on operating system components or data expected to be present on the computing device 102, the code generator 114 can make it more difficult for the correct output of the execution confirmation function to be simulated within the maximum period of time given to the computing device 102 to provide results to the posture assessment system 100.

At block 310, the code generator 114 or some other module or component of the posture assessment system 100 can generate assessment code to be executed by the computing device 102 being assessed. The assessment code can be configured to analyze the components and/or configuration of the commuting device 102, execute one or more execution confirmation functions, and generate output that the posture assessment system 100 can use to verify that the code was executed and that the components and/or configuration of the computing device 102 are as expected. In some embodiments, the assessment code may include all of the logic and functions necessary to execute its assessment operations. In some embodiments, the assessment code may exclude functions commonly provided by computing device 102 operating systems, thereby reducing the size of the assessment code and eliminating any requirement that the assessment code include all of the logic necessary to implement its operations. The assessment code can be executed by or under the control of the API 110 or operating system 120 of the computing device 102 being assessed. As described below, the API 110 can provide a temporarily heightened level of access privileges to the assessment code, thus allowing the assessment code to access operating system components, data in volatile memory, and other information that may not otherwise be available to the assessment code.

In some embodiments, the assessment code may include instructions to access particular operating system components expected to be present on the computing device 102, based on the operating system components identified above at block 306. The assessment code may generate output that the posture assessment system 100 can use to verify that the expected operating system components are indeed present on the computing device 102. The output may include an encoded representation of one or more of the operating system components, such as a hash or other compressed representation. For example, the assessment code may access a particular operating system component, such as the kernel or a driver, and generate a hash of the component. In some embodiments, the assessment code may access data in volatile memory rather than—or in addition to—data in persistent storage. For example, the assessment code may access an area of volatile system memory (e.g., in RAM) that is reserved for the operating system 120. The assessment code can generate an encoded representation of data structures or other information that may be present in the volatile system memory. In this way, the assessment code can obtain provide information to the posture assessment system 100 not only about the operating system 120 components that are on the computing device 102, but also or alternatively the processes—which may not be readily detectable through other means—that have been loaded into the volatile system memory or may otherwise be executing on the computing device 102.

The code generator 114 may include in the assessment code instructions to execute the execution confirmation function(s) selected above at block 308. In addition to the particular execution confirmation function(s), the code generator 114 may include code for executing a number of other execution confirmation functions. For example, a library of execution confirmation functions may be included in the assessment code, and each individual execution confirmation function may be assigned or otherwise associated with an index or other identifier. As described above and in greater detail below, the computing device 102 may determine at run time which particular execution confirmation function or functions to execute based on other information generated during execution of the assessment code. Thus, the particular execution confirmation function to be executed may not be determinable through mere inspection or reverse engineering of the assessment code; instead, actual execution of the code may be necessary to determine which of the execution confirmation functions to execute and/or which input the use during execution.

In some embodiments, the code generator 114 may include in the assessment code one or more additional functions or other operations that, in a manner similar to the execution confirmation function, may not necessarily verify the presence of an operating system component or other data on a computing device 102. Instead, the additional functions may perform calculations, generate intermediate output in support of the execution confirmation functions or configuration verification functions, or otherwise execute on the computing device 102. Such functions may be referred to as auxiliary functions or obfuscation functions, and the executable code for such functions may be referred to as auxiliary code or obfuscation code. In some embodiments, the code generator 114 may include a sufficient amount of auxiliary code in the assessment code such that it is difficult to reverse engineer or simulate proper execution of the assessment code as a whole and to generate the expected output within the allowed period of time to do so. For example, the code generator 114 may generate more than about 50% of the assessment code as auxiliary code, more than about 67% of the assessment code as auxiliary code, more than about 75% of the assessment code as auxiliary code, more than about 90% of the auxiliary code as auxiliary code, or more. The auxiliary code may be interleaved with the other assessment code (e.g., executed between, or in parallel with, other functions of the assessment code).

The code generator 114 may configure the assessment code such that it produces a particular result or set of results that are transmitted to the posture assessment system 100 for verification. The result may include or be based on encoded representations of operating system components accessed by the assessment code, the output of one or more execution confirmation functions, etc. For example, a single hash may be generated using all operating system 120 components and/or data accessed on the computing device 102 by the assessment code, or a separate hash may be generated for each individual operating system 120 component or piece of data. Output of the execution verification function(s) may be included in the results, or may be included in hash function input along with data regarding operating system 120 components and other data on the computing device 102 accessed by the assessment code. Output of auxiliary code may or may not be included in the results. For example, auxiliary code output may simply be discarded, may be used in intermediate steps of other assessment code functions, or may be included in the results that are subsequently transmitted to the posture assessment system 100. In some embodiments, the code generator 114 may include an item of pseudo-randomly generated data, or a substantially unique one-time-use key in the assessment code. Such data may be used by the computing device 102 during execution of assessment code, such as being used as a parameter of an execution confirmation function or included in a hash or other encoded result that is returned to the posture assessment system 100. In this way, the posture assessment system 100 can ensure that the assessment code executed by the computing device 102 is the code transmitted as part of the current instance of the posture assessment process, and has not been reverse engineered or simulated from previously transmitted assessment code. An example of assessment code execution by a computing device 102 is shown in FIG. 5 and described in greater detail below.

In some embodiments, the assessment code generated by the code generator 114 may be binary executable code that can be directly executed by the operating system 120 of the computing device 102. In other embodiments, the assessment code may be assembly code, intermediate code (e.g., Java bytecode), or higher-level code such as interpreted scripting language code. In some embodiments, the assessment code may be encrypted and/or cryptographically signed. The computing device 102 may then require a key to decrypt the code and/or verify the signature of the code, thereby providing a reasonable degree of certainty to the computing device 102 that the assessment code has indeed been generated by the posture assessment system 100 and has not been tampered with or otherwise compromised.

At block 312, the posture assessor 112 or some other module or component of the posture assessment system 100 can generate expected results of the assessment code. The expected results may correspond to the output of the assessment code if the computing device 102 has not been compromised, the expected components and/or data are present on the computing device 102, and the assessment code has actually been executed as expected. In some embodiments, the expected results may include configuration verification data that corresponds to an encoded representation or representations, such as hashes or other compressed representations generated by the assessment code, of items expected to be present on the computing device 102. In some embodiments, there may be more than one acceptable result to execution of the assessment code on the computing device 102. For example, a particular device configuration may be associated with the presence of two or more different but acceptable versions of a particular operating system component. Depending upon which version of the component is on a particular computing device 102, the result generated by the assessment code and transmitted to the posture assessment system 100 may be different.

At block 314, the posture assessor 112 or some other module or component of the posture assessment system 100 can transmit the assessment code to the computing device 102.

At decision block 316, the posture assessor 112 or some other module or component of the posture assessment system 100 can determine whether results of the assessment code executing on the computing device 102 have been received. In some embodiments, the results may be required to be received within a predetermined or dynamically determined period of time from a time at which the assessment code was transmitted to the computing device 102. Alternatively or in addition, the posture assessor 112 may require results to be received without a closure of the network connection over which the assessment code was transmitted to the computing device 102. If the results have been received and other conditions have been satisfied (e.g., timing, open connection, etc.), then the process 300 may proceed to block 318 to analyze the results. Otherwise, if the results are not received within the required period of time or the network connection over which the assessment code was transmitted to the computing device 102 has been closed, the process 300 may terminate at block 326 or perform some other operation. For example, the computing device 102 may be blacklisted, or a new version of assessment code may be generated and transmitted to the computing device 102.

At block 318, the posture assessor 112 or some other module or component of the posture assessment system 100 can analyze the results of execution of the assessment code. Analyzing the results may include comparing one or more encoded representations of operating system components, data, execution confirmation functions, or other information received from the computing device 102 to the expected results generated above at block 312.

At decision block 320, the posture assessor 112 or some other module or component of the posture assessment system 100 can determine whether the computing device 102 has passed the assessment. The determination may be based on whether the actual results of execution of the assessment code at the computing device 102 match the expected results generated at the posture assessment system 100. If the results match, the process 300 can proceed to block 322. Otherwise, if the results do not match, the process 300 can proceed to block 324.

At block 322, the posture assessor 112 or some other module or component of the posture assessment system 100 can perform an operation in response to determining that the results of execution of the assessment code match the expected results. In some embodiments, the operation may include providing a token to the computing device 102. The computing device 102 may use the token as evidence that the posture assessment has been completed. For example, if the computing device 102 subsequently initiates a network connection with a system (whether the posture assessment system 100 or some other system), the token can be provided to the system.

At block 324, the posture assessor 112 or some other module or component of the posture assessment system 100 can perform an operation in response to determining that the results of execution of the assessment code do not match the expected results. In some embodiments, the operation may include adding the computing device 102 to a blacklist of computing devices that whose posture has been assessed and the assessment failed.

Example Process for Requesting and Performing Posture Assessment

FIG. 4 is a flow diagram of an illustrative process 400 that may be executed by a computing device, such as one of the computing devices 102-106 shown in FIG. 2 and described above, to request and perform posture assessment in connection with a posture assessment system 100. Advantageously, the operating system of the computing device requesting posture assessment may include an API that provides mechanisms to request posture assessment from a posture assessment system 100, execute assessment code received from the posture assessment system 100 using a heightened level of privileges, and provide results to the posture assessment system 100.

The process 400 shown in FIG. 4 begins at block 402. The process 400 may begin in response to an event, such as when an application 122 executing on a computing device 102 requests posture assessment. When the process 400 is initiated, a set of executable program instructions stored on one or more non-transitory computer-readable media (e.g., hard drive, flash memory, removable media, etc.) may be loaded into memory (e.g., random access memory or "RAM") of the computing device 102. In some embodiments, the process 400 or portions thereof may be implemented on multiple processors, serially or in parallel.

At block 404, the API 110 or some other module or component of the computing device 102 can request the posture assessment system 100 to assess the current posture of the computing device 102. The request may include information about the computing device 102, such as information about the operating system 120, applications, hardware components, or the like. In some embodiments, the API 110 may first check to determine whether it has a key for decrypting or verifying communications received from the posture assessment system 100, or the posture assessment system 100 may provide a key to the computing device 102. For example, the posture assessment system 100 may provide a key (e.g., separately or with a security certificate) to the computing device 102. The key may be a public key that corresponds to a private key used by the posture assessment system 100 to encrypt or sign messages to be sent to the computing device 102. The computing device 102 can determine whether it has already received and verified this key by querying a local repository of keys to determine whether the key has already been received and stored. If the key has already been received, verified, and stored, the process 400 may proceed. If the computing device 102 has not communicated with the posture assessment system 100 before, the key may be a new key that is not already in the repository. The computing device 102 may prompt a user to authorize secure communication with the posture assessment system 100. If the user grants such authorization, then the key may be saved in the repository for use in decrypting future messages from the posture assessment system 100. In some embodiments, the computing device 102 may not request posture assessment. Instead, posture assessment may be initiated by the posture assessment system 100 based on one or more criteria, or in response to a request from a third-party system.

At block 406, the API 110 or some other module or component of the computing device 102 can receive a message from the posture assessment system 100 in response to the request for assessment. The message may include executable assessment code generated by the posture assessment system 100 for execution by the computing device 102.

At decision block 408, the API 110 or some other module or component of the computing device 102 can determine whether the message received at block 406 can be verified as coming from the posture assessment system 100. In some embodiments, the API 110 can use a public key, previously received from the posture assessment system 100, to verify the message if it has been digitally signed, and/or to decrypt the message if it has been encrypted prior to transmission. If the message is successfully verified and/or decrypted, the process 400 can proceed to block 410. Otherwise, if the message is not successfully verified and/or decrypted, the process 400 may terminate at block 420.

At block 410, the API 110 or some other module or component of the computing device 102 can grant temporary privileges to the assessment code to execute on the computing device 102. For example, the API 110 may temporarily grant administrator-level or root-level privileges to the assessment code.

At block 412, the API 110 or some other module or component of the computing device 102 can execute the assessment code received from the posture assessment system 100. An example process for executing such assessment code is shown in FIG. 5 and described in greater detail below.

At block 414, the API 110 or some other module or component of the computing device 102 can revoke the temporarily heightened privileges granted to the assessment code. The temporarily heightened privileges may be revoked after a predetermined or dynamically determined period of time, or in response to an event such as completion of execution of the assessment code.

At block 416, the API 110 or some other module or component of the computing device 102 can transmit the results, generated by execution of the assessment code, to the posture assessment system 100.

At block 418, the API 110 or some other module or component of the computing device 102 can receive a response or subsequent message from the posture assessment system 100. The message may indicate whether or not the computing device 102 has passed the assessment. In some embodiments, the message may include a token that the computing device 102 can use when establishing connections or otherwise communicating with other systems. The token may include data representing passage or an otherwise positive result of the posture assessment.

Example Process for Executing Remotely-Generated Assessment Code

FIG. 5 is a flow diagram of an illustrative process 500 that may be executed by a computing device, such as one of the computing devices 102-106 shown in FIG. 2 and described above, to execute remotely generated assessment code received from a posture assessment system 100.

The process 500 shown in FIG. 5 begins at block 502. The process 500 may begin in response to an event, such as when assessment code is received from a posture assessment system 100. In some embodiments, the process 500 may be performed as part of another process, such as at block 412 of process 400. When the process 500 is initiated, a set of executable program instructions stored on one or more non-transitory computer-readable media (e.g., hard drive, flash memory, removable media, etc.) may be loaded into memory (e.g., random access memory or "RAM") of a computing device, such as the computing device 102. In some embodiments, the process 500 or portions thereof may be implemented on multiple processors, serially or in parallel.

At block 504, the API 110 or some other module or component of the computing device 102 can compute an encoded representation of one or more items. For example, the assessment code may access various items of the operating system 120 or of the computing device 102, and generate an encoded representation thereof. In some embodiments, the items that are accessed may be files, stored in persistent storage, that provide code for the operating system kernel, various operating system components, drivers, applications, or some combination thereof. In some embodiments, the items that are accessed may be stored in volatile storage, including the volatile system storage reserved for operating system 120 access. For example, data structures and other information indicative of which components are loaded and executing on the computing device 102 may be accessed, and encoded representations thereof may be generated.

The encoded representation of an item may be a hash or other compressed representation. Illustratively, a hash may be computed using one of a variety of hashing algorithms, such as any of the Secure Hash Algorithm or "SHA" functions (e.g., SHA-1, SHA-256, SHA-512) or any of the Message Digest or "MD" algorithms (e.g., MD-2, MD-5). As an alternative, compressed representations may be generated using checksum algorithms, cyclic redundancy check or "CRC" algorithms, or the like. The example algorithms for generating encoded representations of items on the computing device 102 are illustrative only, and are not intended to be limiting. In some embodiments, additional or alternative functions may be used.

At block 506, the API 110 or some other module or component of the computing device 102 can determine one or more execution confirmation functions to execute. The assessment code received from the posture assessment system 100 may include a table, listing, library, or other collection of computationally-expensive execution confirmation functions. Each of the functions may be associated with an index or other identifier. The assessment code may include instructions to compute, at run time, the index of a particular execution confirmation function. The index may be computed using output of another function that is evaluated at run time. In some embodiments, the assessment code may include instructions to use a compressed representation of an operating system component generated above at block 504, or some portion thereof, to determine the execution confirmation function to be executed. For example, portion of a hash of an operating system component may be extracted and used as an index to the table of execution confirmation functions. Thus, it may be difficult or impossible to determine which execution confirmation will be executed by merely inspecting or reverse-engineering the assessment code, or executing the assessment code on another computing device. Rather, in some embodiments the specific execution confirmation function that the posture assessment system 100 expects the computing device 102 to execute may only be determined by executing the assessment code on the computing device 102.

At block 508, the API 110 or some other module or component of the computing device 102 can execute an execution confirmation function determined above. As described herein, the execution confirmation function may be a computationally expensive function, such as a particularly time-consuming mathematic calculation.

At decision block 510, the API 110 or some other module or component of the computing device 102 can determine whether there are additional execution confirmation functions to be executed. In some embodiments, the assessment code may include instructions to chain together execution of multiple execution confirmation functions. For example, the output of one execution confirmation function may be used as input to another execution configuration function, and/or the output of one execution confirmation function may be used to determine the index of another execution confirmation function to be executed. By including instructions to execute a sequence of multiple execution confirmation functions, the overall complexity of the execution confirmation process may be increased and may therefore be more difficult to simulate. Alternatively or in addition, a number of functions that are not necessarily computationally expensive individually may be chained together into a computationally expensive execution confirmation procedure.

At block 512, the API 110 or some other module or component of the computing device 102 can execute obfuscation code included in the assessment code. For example, as described above with respect to FIG. 3, the posture assessment system 100 may have included any number of functions in the assessment code that don't necessarily contribute to the assessment result, or that are not part of an efficient generation of the assessment result. These functions, embodied in obfuscation code (also referred to as auxiliary code) may be helpful in masking how the assessment result is generated by the assessment code and may therefore make it more difficult for the assessment code to be reverse engineered or the assessment result to be simulated. In some embodiments, an auxiliary function may be used as an intermediate step of executing an execution confirmation function, computing a hash, generating assessment results, or performing other operations of the assessment code. In some embodiments, auxiliary functions may be interleaved with other functions of the assessment code, rather than executed as a single subroutine corresponding to a single block of a flow diagram.

At block 514, the API 110 or some other module or component of the computing device 102 can generate assessment results for transmission to the posture assessment system 100. The results may include one or more encoded representations of items as generated above, output of one or more execution confirmation functions, or the like. In some embodiments, a single encoded representation of all items accessed above and/or execution confirmation function output may be generated. For example, input to a hash algorithm may include each of the items accessed above, or data derived therefrom, and output of the execution confirmation function. A single hash may then be generated. In some embodiments, a separate encoded representation of each item accessed above and/or output of the execution confirmation function(s) may be included in the results. In some embodiments, an encoded representation of the assessment code itself may be included in the results to verify that the assessment code was received without being tampered with.

Execution Environment

Figure 6:
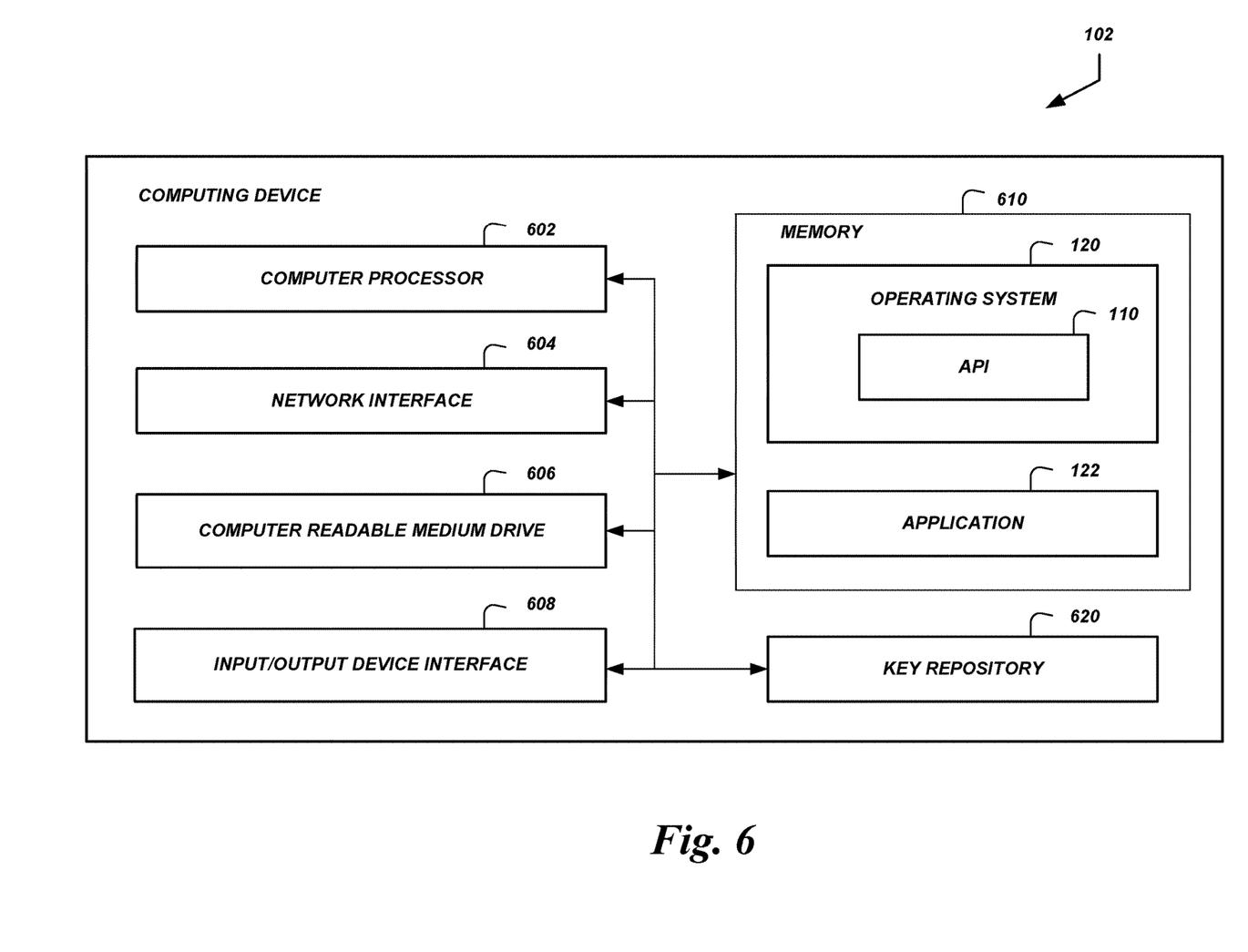
FIG. 6 is a block diagram illustrating components of a computing device configured to execute a transfer process or portions thereof according to some embodiments.

FIG. 6 illustrates the various components of an example computing device 102 configured to provide an operating system API 110 for execution of remotely-generates posture assessment code. In some embodiments, as shown, the computing device 102 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; an input/output device interface 608, such as an IO interface in communication with one or more microphones; and one or more computer readable memories 610, such as random access memory ("RAM") and/or other volatile non-transitory computer-readable media. In some embodiments, the computing device 102 may include a hardware-based key repository 620 that stores keys but does not necessarily allow the keys to be read or used. Rather, the repository 620 will take a key as a function input or argument, and return a result indicative of whether the key is stored in the repository 620.

The computer readable memory 610 may include computer program instructions that one or more computer processors 602 executes in order to implement one or more embodiments. The computer readable memory 610 can store an operating system 120 that provides computer program instructions for use by the computer processor(s) 602 in the general administration and operation of the computing device 102. The operating system 120 may include or be associated with an API 110 for providing various features described herein. In some embodiments, the computer readable memory 610 can further include computer program instructions and other information for implementing aspects of the present disclosure. For example, in one embodiment, the computer-readable memory 610 may include one or more applications 122.

In some embodiments, certain portions of the computing device 102 and/or posture assessment system 100 that have been described with respect to their functional properties may be implemented in hardware, such as a customized chip, or as a combination of hardware and software. For example, the functionality attributed to the operating system API 110 may be provided by a hardware chip of the computing device 102.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a posture assessment system comprising one or more server computing devices, wherein the posture assessment system is configured to at least:
   receive a posture assessment request from a user computing device, the posture assessment request comprising configuration data regarding an operating system configuration of the user computing device;
   generate configuration verification data based at least partly on the configuration data, wherein the configuration verification data comprises an encoded representation of at least a portion of an operating system expected to be present on the user computing device;
   generate an expected assessment result comprising an encoded representation of the configuration verification data, and output of an execution confirmation function that takes at least a threshold period of time to execute;
   generate client-side executable instructions that, when executed, cause the user computing device to generate an assessment result comprising an encoded representation of at least a portion of an operating system present on the user computing device and output of the execution confirmation function;
   transmit the client-side executable instructions to the user computing device;
   receive the assessment result from the user computing device;
   analyze the assessment result with respect to the expected assessment result; and
   transmit a verification token to the user computing device; and a client-side operating system component that configures
the user computing device to at least:
receive the client-side executable instructions from the
posture assessment system;
execute the client-side executable instructions using a
temporarily heightened degree of operating system
access privileges;
transmit the assessment result to the posture assessment
system; and
receive the verification token from the posture assessment system.

2. The system of claim 1, wherein the posture assessment system is further configured to generate a pseudo random data item, wherein the client-side executable instructions comprise executable instructions to use the pseudo random data item during execution of a function.

3. The system of claim 1, wherein the assessment result is required to be received from the user computing device within a second period of time.

4. The system of claim 1, wherein the posture assessment system is further configured to at least:
select the execution confirmation function from a plurality of execution confirmation functions based at least partly on one of: the encoded representation of the portion of the operating system expected to be present on the client device, a pseudo-random number, or output of a function selected using a pseudo-random number,
wherein the client-side executable instructions comprise the plurality of execution confirmation functions.

5. A computer-implemented method comprising:
as performed by a computing system configured to execute specific instructions,
receiving configuration data representing a configuration of a computing device;
generating an encoded representation of at least a portion of data expected to be present on the computing device;
determining an execution confirmation function that takes at least a threshold period of time to execute;
generating an expected response using the encoded representation and output of the execution confirmation function;
generating executable code that, when executed by the computing device, causes the computing device to generate a response comprising an encoded representation of at least a portion of data present on the computing device and output of the execution confirmation function, wherein the executable code comprises a first portion of code for executing auxiliary functions and a second portion of code for generating the response, wherein output from at least a portion of the auxiliary functions is excluded from the response;
receiving the response from the computing device; and
determining whether to validate the computing device based at least partly on analyzing the response with respect to the expected response.

6. The computer-implemented method of claim 5, further comprising blacklisting the computing device based at least partly on the response being different than the expected response.

7. The computer-implemented method of claim 5, further comprising transmitting a token to the computing device based at least partly on the response matching the expected response.

8. The computer-implemented method of claim 5, wherein determining the execution confirmation function comprises selecting the execution confirmation function from a plurality of execution confirmation functions, wherein the executable code comprises the plurality of execution confirmation functions.

9. The computer-implemented method of claim 8, wherein generating the executable code comprises generating code for executing each of the plurality of execution confirmation functions, wherein only a subset of the plurality of execution confirmation functions are to be executed, the subset comprising the execution confirmation function.

10. The computer-implemented method of claim 5, wherein generating the executable code comprises:
generating code that instructs the computing device to generate an encoded representation of an operating system component; and
generating code that instructs the computing device to determine to execute the execution confirmation function, out of a plurality of execution confirmation functions, based at least partly on the encoded representation of the operating system component.

11. The computer-implemented method of claim 5, wherein generating the executable code comprises generating the first portion of code as a majority of the executable code.

12. The computer-implemented method of claim 5, wherein generating the executable code comprises generating code that instructs the computing device to access an area of volatile storage reserved for an operating system executing on the computing device.

13. The computer-implemented method of claim 5, further comprising cryptographically signing the executable code with a private encryption key, wherein the computing device has access to a public decryption key that corresponds to the private encryption key.

14. The computer-implemented method of claim 5, further comprising:
generating an assessment message comprising the executable code and an encoded representation of the executable code; and
transmitting the assessment message to the computing device, wherein determining whether to validate the response comprises analyzing at least a portion of the response with respect to the encoded representation of the executable code.

15. The computer-implemented method of claim 5, wherein determining the execution confirmation function comprises determining a computationally complex function that is computationally complex due to at least one of: a size of an output range of the computationally complex function, or an expected period of time to perform one or more mathematical operations of the computationally complex function.

16. The computer-implemented method of claim 5, wherein determining the execution confirmation function comprises determining a computationally complex function comprising instructions to perform at least one of: determining a key to decrypt an encrypted message, repeated execution of recursive operations to obtain results, or repeated execution of counting operations.

17. A non-transitory computer storage system storing executable instructions, wherein the executable instructions configure a computing system to perform a process comprising:

receiving executable code from a remote server system via an application programming interface (API) of an operating system of the computing system;

granting the executable code a temporarily heightened degree of access privileges;

executing the executable code using the temporarily heightened degree of access privileges to generate a result, wherein the result comprises an encoded representation of at least a portion of data present on the computing system and output of an execution confirmation function that takes at least a threshold period of time to execute;

transmitting the result to the remote server system; and revoking the temporarily heightened degree of access privileges.

18. The non-transitory computer storage system of claim 17, wherein executing the executable code comprises generating an encoded representation of an operating system component.

19. The non-transitory computer storage system of claim 17, wherein executing the executable code comprises selecting the execution confirmation function from a plurality of execution confirmation functions based at least partly on one of: an encoded representation of an operating system component, a pseudo-random number, or output of a function selected using a pseudo-random number.

20. The non-transitory computer storage system of claim 17, wherein the process further comprises verifying a source of the executable code using a locally-stored decryption key.

\* \* \* \* \*